(12) United States Patent
Feng et al.

(10) Patent No.: US 11,656,499 B2
(45) Date of Patent: May 23, 2023

(54) DIRECT-TYPE BACKLIGHT LIQUID CRYSTAL DISPLAY DEVICE

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Hongbo Feng, Beijing (CN); Yongda Ma, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/562,287

(22) Filed: Dec. 27, 2021

(65) Prior Publication Data

US 2023/0004048 A1  Jan. 5, 2023

(30) Foreign Application Priority Data

Jul. 5, 2021 (CN) .......................... 202110755316.1

(51) Int. Cl.
*G02F 1/13357* (2006.01)
*G02F 1/1333* (2006.01)
(Continued)

(52) U.S. Cl.
CPC ...... *G02F 1/133611* (2013.01); *G02F 1/1339* (2013.01); *G02F 1/133308* (2013.01);
(Continued)

(58) Field of Classification Search
None
See application file for complete search history.

(56) References Cited

U.S. PATENT DOCUMENTS

| 2010/0110329 A1 | 5/2010 | Kubota et al. |
| 2014/0218971 A1 | 8/2014 | Wu |

(Continued)

FOREIGN PATENT DOCUMENTS

| CN | 101078840 A | 11/2007 |
| CN | 101089689 A | 12/2007 |

(Continued)

OTHER PUBLICATIONS

Extended European Search Report from European Patent Application No. 21217796.8 dated Jun. 10, 2022.

*Primary Examiner* — Shan Liu
(74) *Attorney, Agent, or Firm* — Dilworth & Barrese, LLP.; Michael J. Musella, Esq.

(57) ABSTRACT

A direct-type backlight liquid crystal display device is provided, which includes a frame including a main frame, a bottom plate; a liquid crystal display panel, on a top surface of the main frame and parallel to the bottom plate, the liquid crystal display panel includes an array substrate, a color film substrate, a liquid crystal layer and a frame sealant, a pixel unit on the color film substrate includes a sub pixel, the sub pixel on a side of the color film substrate along a first direction parallel to the color film substrate is partially blocked and covered by a black matrix, a backlight unit including a light emitting element and a light homogenizing element; a display control unit, at a lateral end surface of the liquid crystal display panel and electrically connected with the liquid crystal display panel at the lateral end surface of the liquid crystal display panel.

19 Claims, 8 Drawing Sheets

(51) Int. Cl.
*G02F 1/1335* (2006.01)
*G02F 1/1339* (2006.01)

(52) U.S. Cl.
CPC .. *G02F 1/133512* (2013.01); *G02F 1/133514* (2013.01); *G02F 1/133606* (2013.01); *G02F 1/133608* (2013.01)

(56) References Cited

U.S. PATENT DOCUMENTS

| | | | |
|---|---|---|---|
| 2015/0309246 A1* | 10/2015 | Wang | G02B 6/0078 362/616 |
| 2016/0373716 A1* | 12/2016 | Lu | H04N 13/302 |
| 2017/0059926 A1* | 3/2017 | Kim | G02F 1/133308 |
| 2017/0219895 A1* | 8/2017 | Yu | G02F 1/13454 |
| 2019/0137829 A1 | 5/2019 | Kim et al. | |
| 2019/0140026 A1* | 5/2019 | Nakanishi | H01L 27/3211 |
| 2022/0229327 A1* | 7/2022 | Kang | G02F 1/133314 |

FOREIGN PATENT DOCUMENTS

| | | | | |
|---|---|---|---|---|
| CN | 102262319 A | | 11/2011 | |
| CN | 104317099 A | * | 1/2015 | ....... G02F 1/133512 |
| CN | 106526989 A | * | 3/2017 | ....... G02F 1/134309 |
| CN | 107167957 A | | 9/2017 | |
| CN | 107479269 A | | 12/2017 | |
| CN | 107731101 A | | 2/2018 | |
| CN | 108364568 A | | 8/2018 | |
| CN | 108417174 A | | 8/2018 | |
| CN | 108692169 A | | 12/2018 | |
| CN | 110928069 A | | 3/2020 | |
| CN | 111505870 A | | 8/2020 | |
| KR | 101097699 B1 | * | 12/2011 | |

* cited by examiner

DIRECT-TYPE BACKLIGHT LIQUID CRYSTAL DISPLAY DEVICE

The application claims priority of Chinese Patent Application No. 202110755316.1, filed on Jul. 5, 2021, the disclosure of which is incorporated herein by reference in its entirety as part of the present application.

TECHNICAL FIELD

Embodiments of the present disclosure relate to a direct-type backlight liquid crystal display device.

BACKGROUND

Display device is divided into a light emitting display device with self-luminous properties and a non-light emitting display device including an additional light source. For example, the non-light emitting display device may include a liquid crystal display (LCD) device. The liquid crystal display device mainly uses a liquid crystal display panel to display. Because the liquid crystal display panel itself does not emit light, it is needed to provide a light source with sufficient brightness and uniform light distribution as a backlight component, so that the liquid crystal display panel can normally display images. In addition, after the liquid crystal display panel is combined with the backlight component, it is usually covered by an outer frame to protect the combination of the liquid crystal display panel and the backlight component.

The backlight component includes at least one of a cold cathode fluorescent lamp (CCFL), an external cathode fluorescent lamp (EEFL) and a light emitting diode (LED) as the light source. LED is widely used because of its advantages of small size, low power consumption and high reliability. Backlight component can be divided into two types according to their different structures, including: a side-type light backlight component and a direct-type (or a flat-type) backlight component. In the side-type light backlight component, the light source is arranged on a lateral side of the backlight component, and a light guide plate is used to enhance the control of a propagation direction of the light. However, because the propagation direction of the light is not easy to control, the display effect is usually poor when the side-type light backlight component is adopted. In contrast, the design of the direct-type backlight component places lamp tubes as the light source directly below the backlight component. Because the installation space of the backlight component becomes larger, more than two lamp tubes can be used to increase the intensity of the light source, which is more suitable for general liquid crystal display devices.

SUMMARY

At least one embodiment of the present disclosure provides a direct-type backlight liquid crystal display device, which includes: a frame, including a main frame and a bottom plate, the main frame is connected with the bottom plate at an end face of the bottom plate; a liquid crystal display panel, arranged on a top surface of the main frame and parallel to the bottom plate, the liquid crystal display panel includes an array substrate, a color film substrate, a liquid crystal layer sandwiched between the array substrate and the color film substrate, and a frame sealant which surrounds the liquid crystal layer, is located between the color film substrate and the array substrate, and is used for fixing the color film substrate and the array substrate, a pixel unit on the color film substrate includes a sub pixel, and the sub pixel located on a side of the color film substrate along a first direction parallel to the color film substrate is partially blocked and covered by a black matrix, a backlight unit, located on a side of the liquid crystal display panel close to the bottom plate, the backlight unit includes a light emitting element and a light homogenizing element, the light emitting element is disposed on the bottom plate, light emitted by the light emitting element is projected at a light incident side of the liquid crystal display panel after being adjusted by the light homogenizing element, the light homogenizing element is disposed on the top surface of the main frame, parallel to the bottom plate and fixed with the main frame, a lateral end surface of the light homogenizing element, a lateral end surface of the liquid crystal display panel and a lateral end surface of the main frame are aligned in a direction perpendicular to a main surface of the bottom plate; and a display control unit, disposed at the lateral end surface of the liquid crystal display panel and electrically connected with the liquid crystal display panel at the lateral end surface of the liquid crystal display panel.

For example, in the direct-type backlight liquid crystal display device provided by at least one embodiment of the present disclosure, the sub pixel located on the side of the color film substrate along the first direction includes a blue sub pixel, the blue sub pixel located on the side of the color film substrate along the first direction is partially blocked and covered by the black matrix from one side, and has an effective display area which is smaller than an effective display area of a blue sub pixel in a middle region of the color film substrate.

For example, in the direct-type backlight liquid crystal display device provided by at least one embodiment of the present disclosure, the sub pixel located on the side of the color film substrate along the first direction further includes a red sub pixel, and an effective display area of the red sub pixel located on the side of the color film substrate along the first direction is smaller than an effective display area of a red sub pixel located in the middle region of the color film substrate.

For example, in the direct-type backlight liquid crystal display device provided by at least one embodiment of the present disclosure, the effective display area of the blue sub pixel located on the side of the color film substrate and partially blocked and covered by the black matrix is $1/50$ to $4/5$ of the effective display area of the blue sub pixel in the middle region of the color film substrate, and/or the effective display area of the red sub pixel located on the side of the color film substrate along the first direction is $1/50$ to $4/5$ of the effective display area of the red sub pixel located in the middle region of the color film substrate.

For example, in the direct-type backlight liquid crystal display device provided by at least one embodiment of the present disclosure, the sub pixel located on a side of the color film substrate along a second direction parallel to the color film substrate is partially blocked by the frame sealant, and the first direction is perpendicular to the second direction, and an effective display area of the sub pixel blocked by the frame sealant is smaller than an effective display area of a corresponding sub pixel with a same color located in the middle region of the color film substrate and not blocked by the frame sealant.

For example, in the direct-type backlight liquid crystal display device provided by at least one embodiment of the present disclosure, the effective display area of the sub pixel located on the side of the color film substrate along the second direction and blocked by the frame sealant is $1/50$ to ⅘ of the effective display area of the corresponding sub pixel with the same color located in the middle region of the color film substrate and not blocked by the frame sealant.

For example, in the direct-type backlight liquid crystal display device provided by at least one embodiment of the present disclosure, a width, along the first direction, of a blocked portion of the sub pixel located on the side of the color film substrate along the first direction and covered by the black matrix is ⅐ to ⅓ of a width, along the first direction, of the sub pixel located in the middle region of the color film substrate and not covered by at least one of the black matrix and the frame sealant; or a length, along the second direction, of a blocked portion of the sub pixel located on the side of the color film substrate along the second direction and blocked by the frame sealant is 1/20 to ⅓ of a length, along the second direction, of the corresponding sub pixel with the same color located in the middle region of the color film substrate and not blocked by at least one of the black matrix and the frame sealant.

For example, in the direct-type backlight liquid crystal display device provided by at least one embodiment of the present disclosure, a display mode of the liquid crystal display panel is an in-plane switching mode, and the sub pixel of the pixel unit on the color film substrate includes a first strip-shaped portion extending in a third direction parallel to the color film substrate and a second strip-shaped portion extending in a fourth direction parallel to the color film substrate, so that the sub pixel presents a ">" shape, and an included angle between the first strip-shaped portion and the second strip-shaped portion is 120 degrees to 170 degrees.

For example, in the direct-type backlight liquid crystal display device provided by at least one embodiment of the present disclosure, the display mode of the liquid crystal display panel is an advanced super-dimension switching mode, and the sub pixel of the pixel unit on the color film substrate has a rectangular shape, and a length, along the second direction, of a blocked portion of the sub pixel located at the side of the color film substrate along the first direction and covered by the black matrix is ⅛ to ½ of a length, along the second direction, of a sub pixel located in the middle region of the color film substrate and not covered by the black matrix; or, a width, along the first direction, of a covered portion of the sub pixel located at the side of the color film substrate along the first direction and covered by the black matrix is ¼ to ⅔ of a width, along the first direction, of the sub pixel in the middle region of the color film substrate not covered by the black matrix.

For example, in the direct-type backlight liquid crystal display device provided by at least one embodiment of the present disclosure, the width, along the first direction, of the sub pixel located in the middle region of the color film substrate and not covered by at least one of the black matrix and the frame sealant is 180 microns to 200 microns; the width, along the first direction, of the blocked portion of the sub pixel located on the side of the color film substrate along the first direction and covered by the black matrix is 150 microns to 170 microns; or the width, along the second direction, of the sub pixel located on the side of the color film substrate along the second direction and not blocked by at least one of the black matrix and the frame sealant is 530 microns to 560 microns; the width, along the second direction, of the sub pixel blocked by at least one of the black matrix and the frame sealant is 500 microns to 525 microns, and a blocking ratio is larger than 1/80.

For example, in the direct-type backlight liquid crystal display device provided by at least one embodiment of the present disclosure, at least part of a boundary of the sub pixel in the color film substrate is parallel to at least part of a boundary of the frame sealant.

For example, in the direct-type backlight liquid crystal display device provided by at least one embodiment of the present disclosure, the boundary of the sub pixel has a first corner formed by a first edge and a second edge, and the boundary of the frame sealant has a second corner formed by a third edge and a fourth edge, the first corner and the second corner are conformal, the first edge and the third edge are parallel to each other, and the second edge and the fourth edge are parallel to each other.

For example, in the direct-type backlight liquid crystal display device provided by at least one embodiment of the present disclosure, within a length range corresponding to a single sub pixel along the second direction, there are a part with varying distance and a part with constant distance between the boundary of the sub pixel and the boundary of the frame sealant, and a length of the sub pixel corresponding to the part with varying distance along the first direction is smaller than a length of the sub pixel corresponding to the part with constant distance along the first direction.

For example, in the direct-type backlight liquid crystal display device provided by at least one embodiment of the present disclosure, at least part of the boundary of a side of the frame sealant facing the sub pixel of the color film substrate has a shape of a broken line with a peak and a valley.

For example, in the direct-type backlight liquid crystal display device provided by at least one embodiment of the present disclosure, a length, along the second direction, of a blocked portion of the sub pixel located on the side of the color film substrate along the first direction and covered by the black matrix is ⅛ to ½ of a length, along the second direction, of the sub pixel located in the middle region of the color film substrate and not covered by the black matrix; or a width, along the first direction, of a blocked portion of the sub pixel located on the side of the color film substrate along the first direction and blocked by the black matrix is ¼ to ⅔ of a width, along the first direction, of the sub pixel located in the middle region of the color film substrate and not covered by the black matrix.

For example, in the direct-type backlight liquid crystal display device provided by at least one embodiment of the present disclosure, sub pixels on the color film substrate are arranged in a matrix, and each of the sub pixels has a rectangular shape.

For example, in the direct-type backlight liquid crystal display device provided by at least one embodiment of the present disclosure, a display mode of the liquid crystal display panel is an advanced super-dimension switching mode, and a length, along the second direction, of a blocked portion of the sub pixel located at the side of the color film substrate along the first direction and covered by the black matrix is ⅓ of a length, along the second direction, of the sub pixel located in the middle region of the color film substrate and not covered by the black matrix; and a width, along the first direction, of a blocked portion of the sub pixel located at the side of the color film substrate along the first direction and covered by the black matrix is ⅓ of a width, along the first direction, of the sub pixel in the middle region of the color film substrate not covered by the black matrix.

For example, in the direct-type backlight liquid crystal display device provided by at least one embodiment of the present disclosure, the display mode of the liquid crystal display panel is an in-plane switching mode, the sub pixel of the pixel unit on the color film substrate presents a ">"

shape, and the sub pixel located on a side of the color film substrate along the second direction is blocked by the frame sealant, and the first direction is perpendicular to the second direction, and a length, along the second direction, of a blocked portion of the sub pixel blocked by the frame sealant is 1/16 of a length, along the second direction, of a corresponding sub pixel with the same color located in the middle region of the color film substrate and not blocked by the frame sealant.

For example, in the direct-type backlight liquid crystal display device provided by at least one embodiment of the present disclosure, the main frame protrudes to a side close to the light emitting element to form an arc surface, and a diffuse reflection structure is arranged on the arc surface located at the side close to the light emitting element, and a position of the diffuse reflection structure is between (L1-L2)*tan (θ/2) and a height H, where L1 is a perpendicular distance from a center of a light emitting element that is closest to the diffuse reflection structure to an edge of a side of the main frame where the diffuse reflection structure is arranged, L2 is a perpendicular distance between an axis of the center of the light emitting element that is closest to the diffuse reflection structure in a direction perpendicular to the main surface of the bottom plate and the diffuse reflection structure, H is a perpendicular distance between the main surface of the bottom plate and a main surface of the light homogenizing element close to the bottom plate, and θ is an effective exiting angle of the light emitting element.

For example, in the direct-type backlight liquid crystal display device provided by at least one embodiment of the present disclosure, the diffuse reflection structure is a reflective film formed by a diffuse reflection painting process, a thickness of the diffuse reflection structure ranges from 0.15 microns to 0.03 millimeters, and a diffuse reflection angle of each part of the diffuse reflection structure ranges from 300 degrees to 340 degrees.

For example, in the direct-type backlight liquid crystal display device provided by at least one embodiment of the present disclosure, the main frame protrudes to the side close to the light emitting element to form the arc surface, and an optical reflective structure is arranged on the arc surface located at the side close to the light emitting element, and the optical reflective structure uniformly reflects direct light of the backlight unit to the light incident side of the liquid crystal display panel or to the light homogenizing element of the backlight unit.

For example, in the direct-type backlight liquid crystal display device provided by at least one embodiment of the present disclosure, the optical reflective structure is a diffuse reflective coating layer or a directional reflective film.

For example, in the direct-type backlight liquid crystal display device provided by at least one embodiment of the present disclosure, the optical reflective structure has a length of 5 cm and a width of 2.5 cm, and a reflective patch formed by crossing ends of two adjacent optical reflective structures or extension lines of the ends of the two adjacent optical reflective structures has an "L" shape.

For example, in the direct-type backlight liquid crystal display device provided by at least one embodiment of the present disclosure, the main frame protrudes to a side close to the light emitting element to form an accommodation space at the arc surface away from the light emitting element, and a circuit board of the display control unit located at a side of the liquid crystal display panel close to the light emitting element is located in the accommodation space.

For example, in the direct-type backlight liquid crystal display device provided by at least one embodiment of the present disclosure, the pixel unit located on at least one side of outer periphery of the color film substrate includes a plurality of blue sub pixels arranged in sequence, the plurality of blue sub pixels correspond to an edge of a light emitting spot of the backlight unit located at a lower side of the plurality of blue sub pixels.

For example, in the direct-type backlight liquid crystal display device provided by at least one embodiment of the present disclosure, a reflective unit is arranged at a side of the main frame close to the light emitting element, the reflective unit reflects blue light emitted by the light emitting element to a blue sub pixel located on an outermost side of the color film substrate.

For example, in the direct-type backlight liquid crystal display device provided by at least one embodiment of the present disclosure, the reflective unit reflects the blue light emitted by the light emitting element to the light incident side of the liquid crystal display panel, and an effective display area of the blue sub pixel located at the outermost side of the color film substrate is smaller than an effective display area of a blue sub pixel located in a middle region of the color film substrate.

For example, in the direct-type backlight liquid crystal display device provided by at least one embodiment of the present disclosure, a maximum distance between a center of the light emitting element that is closest to the main frame and the main frame is L=h*tan θ/2, where H is a perpendicular distance between the main surface of the bottom plate and a main surface of the light homogenizing element close to the bottom plate, and θ is an effective exiting angle of the light emitting element.

For example, in the direct-type backlight liquid crystal display device provided by at least one embodiment of the present disclosure, the light emitting element is a light emitting diode with an effective exiting angle of 30 degrees to 60 degrees and a maximum distance between the light emitting element and the main frame is 2.5 cm to 5 cm.

For example, in the direct-type backlight liquid crystal display device provided by at least one embodiment of the present disclosure, the effective exiting angle of the light emitting element is 60 degrees, the maximum distance between the light emitting element and the main frame is 3.5 cm, and H is 3.5 cm.

For example, in the direct-type backlight liquid crystal display device provided by at least one embodiment of the present disclosure, three sub pixels included in each pixel unit in N-th row are arranged repeatedly in an order of RGB along the first direction, three sub pixels included in each pixel unit in (N+1)-th row are arranged repeatedly in an order of GBR along the first direction, and three sub pixels included in each pixel unit in (N+2)-th row are arranged repeatedly in an order of BRG along the first direction, where N is a positive integer; or, the three sub pixels included in each pixel unit in the N-th row are arranged repeatedly in an order of RGB along the first direction, the three sub pixels included in each pixel unit in the (N+1)-th row are arranged repeatedly in an order of GBR along the first direction, and the three sub pixels included in each pixel unit in the (N+2)-th row are arranged repeatedly in an order of BGR along the first direction, where N is a positive integer.

For example, in the direct-type backlight liquid crystal display device provided by at least one embodiment of the present disclosure, a planar shape of the color film substrate is rectangular, and vertical pixel units are provided in areas corresponding to four corners of the color film substrate, and three sub pixels included in each of the vertical pixel units each has a rectangular shape, and the three sub pixels included in each of the vertical pixel units are sequentially arranged along a second direction parallel to the color film substrate, long edges of the three sub pixels are all perpendicular to an edge of the liquid crystal display panel along the second direction, the second direction is perpendicular to the first direction.

For example, in the direct-type backlight liquid crystal display device provided by at least one embodiment of the present disclosure, 2 to 5 vertical pixel units are provided in an area corresponding to each of the four corners of the color film substrate.

For example, the direct-type backlight liquid crystal display device provided by at least one embodiment of the present disclosure further includes an optical light guiding structure, the optical light guiding structure is overlapped and jointed at an adjacent position of the two liquid crystal display panels, and the optical light guiding structure enables light at a lower light incident surface of the optical light guiding structure to exit through a main body of the optical light guiding structure and a non-planar optical structure located on a surface of the optical light guiding structure away from the bottom plate, and makes a non-display region of a seam between the two liquid crystal display panels located at a lower side of the optical light guiding structure invisible.

For example, in the direct-type backlight liquid crystal display device provided by at least one embodiment of the present disclosure, a cross-sectional shape of the surface of the optical light guiding structure away from the bottom plate has a zigzag shape or an arc shape.

For example, in the direct-type backlight liquid crystal display device provided by at least one embodiment of the present disclosure, the optical light guiding structure includes at least one of a Fresnel optical lens and a light guide film.

For example, in the direct-type backlight liquid crystal display device provided by at least one embodiment of the present disclosure, pixel units under the optical light guiding structure are formed into 3 to 5 rows or 3 to 5 columns, and widths of the pixel units in the 3 to 5 rows or 3 to 5 columns increase from the outer periphery to the middle region in turn.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or a mechanical connection, but may comprise an electrical connection which is direct or indirect. The terms "on," "under," "right," "left" and the like are only used to indicate relative position relationship, and in a case that the position of an object is described as being changed, the relative position relationship may be changed accordingly.

The inventor(s) of the present disclosure has noticed that the display effect of an assembled direct-type backlight liquid crystal display device can be improved based on a liquid crystal display panel with extremely narrow frame, light mixing and light efficiency utilization of the direct-type backlight, and side bonding process of the liquid crystal display panel. In this direct-type backlight liquid crystal display device, the bonding mode between the liquid crystal display panel and the backlight unit, and between the backlight unit and the frame can also improve the display effective proportion of the liquid crystal display panel.

Figure 1:
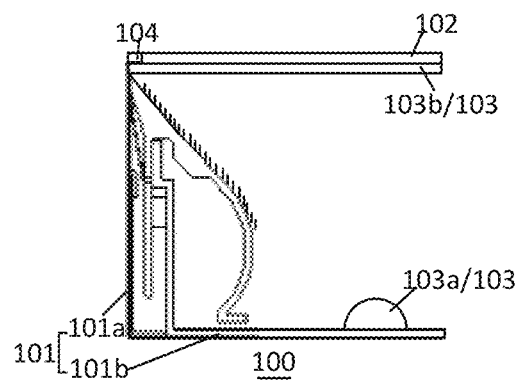
FIG. 1 is a schematic cross-sectional structure diagram of a direct-type backlight liquid crystal display device provided by an embodiment of the present disclosure.

For example, FIG. 1 is a schematic cross-sectional structure of a direct-type backlight liquid crystal display device provided by an embodiment of the present disclosure. As illustrated by FIG. 1, the direct-type backlight liquid crystal display device 100 includes a frame 101 including a main frame 101a and a bottom plate 101b, the main frame 101a is connected with the bottom plate 101b at an end face of the bottom plate 101b; a liquid crystal display panel 102 arranged on a top surface of the main frame 101a and parallel to the bottom plate 101b; a backlight unit 103, located on a side of liquid crystal display panel 102 close to bottom plate 101b, the backlight unit 103 includes a light emitting element 103a and a light homogenizing element 103b, light emitted by light emitting element 103a is projected to a light incident side of liquid crystal display panel 102 after being adjusted by the light homogenizing element 103b. The light homogenizing element 103b is arranged on the top surface of the main frame 101a and parallel to the bottom plate 101b, and is fixed with the main frame 101a. A lateral end surface of the light homogenizing element 103b, a lateral end surface of the liquid crystal display panel 102 and a lateral end surface of the main frame 101a are aligned in a direction perpendicular to the main surface of the bottom plate 101b; a display control unit 104 disposed at a lateral end surface of the liquid crystal display panel 102 and electrically connected to the liquid crystal display panel 102 at the lateral end surface of the liquid crystal display panel 102.

It should be noted that the main surface of the bottom plate 101b refers to the surface of the bottom plate 101b provided with light emitting elements 103b, the number of which may be one or more, and in the case where the number of light emitting elements 103b is multiple, the light emitting elements 103b may be arranged in a row or in a matrix.

Figure 2:
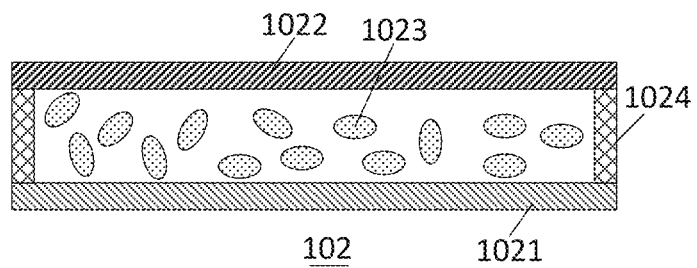
FIG. 2 is a schematic cross-sectional structure diagram of a liquid crystal display panel provided by an embodiment of the present disclosure.

For example, FIG. 2 is a schematic cross-sectional structure diagram of a liquid crystal display panel provided by an embodiment of the present disclosure, as illustrated by FIG. 2, the liquid crystal display panel 102 includes an array substrate 1021, a color film substrate 1022, a liquid crystal layer 1023 sandwiched between the array substrate 1021 and the color film substrate 1022, and a frame sealant 1024 surrounding the liquid crystal layer 1023 and located between the color film substrate 1022 and the array substrate 1022 to fix the color film substrate 1022 and the array substrate 1021.

Figure 3:
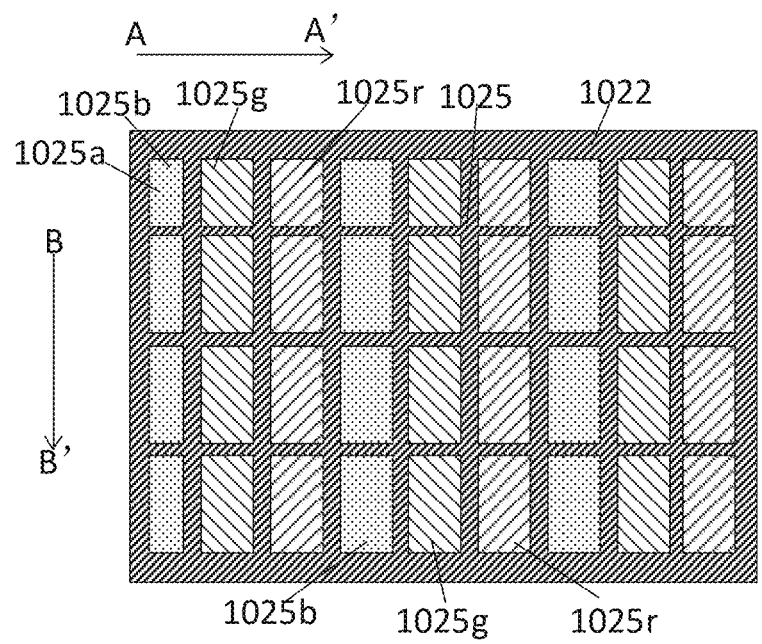
FIG. 3 is a schematic plan view of a color film substrate provided by an embodiment of the present disclosure.

For example, FIG. 3 is a schematic plan view of a color film substrate provided by an embodiment of the present disclosure, as illustrated by FIG. 3, a pixel unit 1025 on the color film substrate 1022 includes a sub pixel 1025a, and the sub pixel 1025a at a side of the color film substrate 1022 along a first direction A-A' parallel to the color film substrate 1022 is partially blocked and covered by a black matrix (not shown in the figure).

It should be noted that, upon a length and a width of the sub pixel being mentioned later, a blocked portion of the sub pixel blocked by black matrix is not counted as a part of the length or the width of the sub pixel.

Generally, for example, one pixel unit 1025 includes a red sub pixel 1025r, a green sub pixel 1025g and a blue sub pixel 1025b. For example, the light emitting element 103a is a light emitting diode, and light emitted by the light emitting diode is white, and a black matrix and a frame sealant 1024 are arranged at an edge of the pixel region, so that the black matrix and the frame sealant 1024 will block some sub pixels 1025a, resulting in uneven light emission and low color purity of the emitted light. The inventor(s) of the present disclosure noticed that, among red light, green light and blue light, the wavelength of the blue light is the shortest, so that blue light is easier to be deflected; that is, under the same incident angle, the deflection angle of the blue light is the largest, so that it can be considered to set blue sub pixels at the outermost edge of the pixel region, so that the unmixed blue light directly passes through the blue sub pixels to improve light efficiency and color saturation, thereby improving the utilization rate of white light emitted by light emitting diode and improving the uniformity of light emission.

For example, as illustrated by FIG. 3, the sub pixel 1025a located on the side of the color film substrate 1022 along the first direction A-A' includes a blue sub pixel 1025b, the blue sub pixel 1025b located on the side of the color film substrate 1022 is partially blocked and covered by a black matrix from one side, so that its width is narrowed and its effective display area is smaller than that of a blue sub pixel 1025b located in the middle region of the color film substrate 1022. For example, in FIG. 3, a part, along the first direction A-A', of each of the leftmost blue sub pixels 1025b is blocked by the black matrix, so that the width of each of the leftmost blue sub pixels 1025b is narrowed, so that the effective display area of each of the leftmost blue sub pixels 1025b is smaller than that of the blue sub pixels 1025b in the right region or in the middle region.

For example, as illustrated by FIG. 3, the effective display area of the blue sub pixel 1025b located on the side of the color film substrate 1022 and partially blocked and covered by the black matrix is $1/50$ to $4/5$ of that of the blue sub pixel 1025b located in the middle region of the color film substrate 1022. For example, the effective display area of the blue sub pixel 1025b located on the side of the color film substrate 1022 covered by the black matrix is $1/40$, $1/30$, $1/20$, $1/10$, $1/5$, $2/5$, $3/5$ or $4/5$ of that of the blue sub pixel 1025b located in the middle region of the color film substrate 1022.

For example, as illustrated by FIG. 3, the sub pixel 1025b located on the side of the color film substrate 1022 along the first direction A-A' further includes a red sub pixel 1025r, whose effective display area is smaller than that of a red sub pixel located in the middle region of the color film substrate 1022. For example, in FIG. 3, the effective display area of red sub pixel 1025r located in the first row is smaller than that of red sub pixel 1025r located in other rows.

For example, in an example, the effective display area of the red sub pixel 1025r located on the side of the color film substrate 1022 along the first direction A-A' is $1/50$ to $4/5$ of the effective display area of the red sub pixel 1025r located in the middle region of the color film substrate 1022. For example, the effective display area of the red sub pixel 1025r located on the side of the color film substrate 1022 is ⅟40, ⅟30, ⅟20, ⅟10, ⅕, ⅖, ⅗ or ⅘ of that of the red sub pixel 1025*r* located in the middle region of the color film substrate 1022.

For example, as illustrated by FIG. 3, the sub pixel 1025*b* located on the side of the color film substrate 1022 along the first direction A-A' further includes a green sub pixel 1025*g*, whose effective display area is smaller than the effective display area of a green sub pixel 1025*g* located in the middle region of the color film substrate 1022. For example, in FIG. 3, the effective display area of the green sub pixels 1025*g* located in the first row is smaller than the effective display area of the green sub pixel 1025*g* located in other rows.

For example, in FIG. 3, the first direction A-A' and the second direction B-B' are perpendicular to each other, and the sub pixel 1025*a* located on a side of the color film substrate 1022 along the second direction B-B' parallel to the color film substrate 1022 is partially blocked by the frame sealant (not shown in FIG. 3), and the effective display area of the sub pixel 1025*a* blocked by the frame sealant is smaller than the effective display area of a corresponding sub pixel with the same color located in the middle region and not blocked by the frame sealant.

For example, in FIG. 3, due to the blocking of the frame sealant 1024, a part of each sub pixel 1025*a* located in the first row is blocked, so that the length of each sub pixel 1025*a* located in the first row becomes smaller. For example, in an example, the length of the blue sub pixel 1025*b* in the first row is 515.16 microns, and the length of the blue sub pixel 1025*b* in the middle region is 551.37 microns. In this way, the effective display area of each sub pixel 1025*b* located in the first row is smaller than that of the sub pixel 1025*b* with the corresponding color located in other rows.

For example, in an example, the effective display area of the sub pixel 1025*a* located on the side of the color film substrate 1022 along the second direction B-B' and blocked by the frame sealant is ⅟50 to ⅘ of the effective display area of a corresponding sub pixel 1022*a* with the same color located in the middle region of the color film substrate 1022 and not blocked by the frame sealant.

For example, in an example, the effective display area of the green sub pixel 1025*g* located on the side of the color film substrate 1022 along the second direction B-B' and blocked by the frame sealant is ⅟50 to ⅘ of the effective display area of the green sub pixel 1025*g* located in the middle region of the color film substrate 1022 and not blocked by the frame sealant. For example, the effective display area of the green sub pixel 1025*g* located on the side of the color film substrate 1022 along the second direction B-B' and partially blocked and covered by the frame sealant 1024 is ⅟40, ⅟30, ⅟20, ⅟10, ⅕, ⅖, ⅗ or ⅘ of the effective display area of the green sub pixel 1025*g* located in the middle region of the color film substrate 1022 and not blocked by the frame sealant.

For example, in an example, the effective display area of the red sub pixel 1025*r* located on the side of the color film substrate 1022 along the second direction B-B' and blocked by the frame sealant is ⅟50 to ⅘ of the effective display area of the red sub pixel 1025*r* located in the middle region of the color film substrate 1022 and not blocked by the frame sealant. For example, the effective display area of the red sub pixel 1025*r* located on the side of the color film substrate 1022 along the second direction B-B' and partially blocked and covered by the frame sealant 1024 is ⅟40, ⅟30, ⅟20, ⅟10, ⅕, ⅖, ⅗ or ⅘ of the effective display area of the red sub pixel 1025*r* located in the middle region of the color film substrate 1022 and not blocked by the frame sealant.

For example, in an example, the effective display area of the blue sub pixel 1025*b* located on the side of the color film substrate 1022 along the second direction B-B' and blocked by the frame sealant is ⅟50-⅘ of the effective display area of the blue sub pixel 1025*b* located in the middle region of the color film substrate 1022 and not blocked by the frame sealant. For example, the effective display area of the blue sub pixel 1025*b* located on the side of the color film substrate 1022 along the second direction B-B' and partially blocked and covered by the frame sealant 1024 is ⅟40, ⅟30, ⅟20, ⅟10, ⅕, ⅖, ⅗ or ⅘ of the effective display area of the blue sub pixel 1025*b* located in the middle region of the color film substrate 1022 and not blocked by the frame sealant.

For example, as illustrated by FIG. 3, in an example, a width, along the first direction A-A', of a blocked portion of the sub pixel 1025*a* located on the side of the color film substrate 1022 along the first direction A-A' and covered by the black matrix is ⅟7 to ⅓ of a width, along the first direction A-A', of the sub pixel 1025*a* located in the middle region of the color film substrate and not covered by at least one of the black matrix and the frame sealant. That is, an effective width of the sub pixel 1025*a* located on the side of the color film substrate 1022 along the first direction A-A' and covered by the black matrix is ⅔ to ⁶⁄₇ of the width, along the first direction A-A', of the sub pixel 1025*a* located in the middle region of the color film substrate and not covered by at least one of the black matrix and the frame sealant.

For example, in an example, the width, along the first direction A-A', of a blocked portion of the sub pixel 1025*a* located on the side of the color film substrate 1022 along the first direction A-A and covered by the black matrix is ⅟7 to ⅓, for example, ⅟7, ²⁄₇, ⅙, ⅕, ¼, or ⅓ of the width, along the first direction A-A', of the sub pixel 1025*a* located in the middle region of the color film substrate and not covered by at least one of the black matrix and the frame sealant. For example, the width of the blue sub pixel 1025*b* in the upper left corner is 155 microns, and the width of the blue sub pixel 1025*b* in the middle region is 190 microns.

For example, in an example, the width, along the first direction A-A', of a blocked portion of the red sub pixel 1025*r* located on the side of the color film substrate 1022 along the first direction A-A' and covered by the black matrix is ⅟7 to ⅓, for example, ⅟7, ²⁄₇, ⅙, ⅕, ¼, or ⅓ of the width, along the first direction A-A', of the red sub pixel 1025*r* located in the middle region of the color film substrate and not covered by at least one of the black matrix and the frame sealant.

For example, in an example, the width, along the first direction A-A', of a blocked portion of the green sub pixel 1025*g* located on the side of the color film substrate 1022 along the first direction A-A and covered by the black matrix is ⅟7 to ⅓, for example, ⅟7, ²⁄₇, ⅙, ⅕, ¼, or ⅓ of the width, along the first direction A-A', of the green sub pixel 1025*g* located in the middle region of the color film substrate and not covered by at least one of the black matrix and frame sealant.

For example, as illustrated by FIG. 3, in an example, a length, along the second direction B-B', of a blocked portion of sub pixel 1025*a* located on the side of color film substrate along the second direction B-B' is ⅟20 to ⅓ of a length, along the second direction B-B', of a corresponding sub pixel 1025*a* with the same color located in the middle region of color film substrate 1022 and not blocked by at least one of the black matrix and the frame sealant.

For example, in an example, the length, along the second direction B-B', of a blocked portion of a green sub pixel 1025g located on the side of color film substrate along the second direction B-B' is 1/20 to 1/3, for example, 1/20, 1/15, 1/10, 1/5, 1/4, or 1/3 of the length, along the second direction B-B', of a green sub pixel 1025g located in the middle region of color film substrate 1022 and not blocked by at least one of the black matrix and the frame sealant. For example, in an example, the length, along the second direction B-B', of an unblocked portion of the green sub pixel 1025g located on the side of color film substrate along the second direction B-B' is 510 microns, and the length of the green sub pixel 1025g located in the middle region is 545 microns, so that the effective display area of the green sub pixel 1025g located in the first row is smaller than that of the green sub pixel 1025g in other rows.

For example, in an example, the length, along the second direction B-B', of a blocked portion of a blue sub pixel 1025b located on the side of color film substrate along the second direction B-B' is 1/20 to 1/3, for example, 1/20, 1/15, 1/10, 1/5, 1/4, or 1/3 of the length, along the second direction B-B', of a blue sub pixel 1025b located in the middle region of color film substrate 1022 and not blocked by at least one of the black matrix and the frame sealant.

For example, in an example, the length, along the second direction B-B', of a blocked portion of a red sub pixel 1025r located on the side of color film substrate along the second direction B-B' is 1/20 to 1/3, for example, 1/20, 1/15, 1/10, 1/5, 1/4, or 1/3 of the length, along the second direction B-B', of a red sub pixel 1025r located in the middle region of color film substrate 1022 and not blocked by at least one of the black matrix and the frame sealant.

Figure 4:
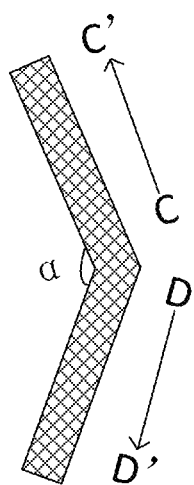
FIG. 4 is a schematic plan view of a sub pixel provided by an embodiment of the present disclosure.

For example, FIG. 4 is a schematic plan view of a sub pixel provided by an embodiment of the present disclosure, as illustrated by FIG. 4, a display mode of the liquid crystal display panel 102 is an in-plane switching (IPS) mode. A sub pixel 1025a of a pixel unit 1025 on the color film substrate 1022 includes a first strip-shaped portion 1026a extending in a third direction C-C' parallel to the color film substrate 1022 and a second strip-shaped portion 1026b extending in a fourth direction D-D' parallel to the color film substrate 1022, so that the sub pixel 1025 presents a ">" shape. An included angle α between the first strip portion 1026a and the second strip portion 1026b is 120 degrees to 170 degrees, for example, the included angle α between the first strip portion 1026a and the second strip portion 1026b is 120 degrees, 130 degrees, 140 degrees, 150 degrees, 160 degrees or 170 degrees.

For example, in an example, the display mode of the liquid crystal display panel is an advanced super-dimension switching (ADS) mode. With reference to FIG. 3, the sub pixel 1025a of the pixel unit 1025 on the color film substrate 1022 has a rectangular shape. The length, along the second direction, of a blocked portion of the sub pixel 1025a located on the side of the color film substrate 1022 along the first direction A-A' and covered by the black matrix is 1/8 to 1/2, for example, 1/8, 1/7, 1/6, 1/5, 1/4, 1/3, or 1/2 of the length, along the second direction, of the sub pixel 1025a located in the middle region of the color film substrate 1022 and not covered by the black matrix.

For example, in an example, the width, along the first direction, of a blocked portion of the sub pixel 1025a located on the side of color film substrate 1022 along the first direction A-A' and covered by black matrix is 1/4 to 2/3, for example, 1/4, 1/3, 1/2, or 2/3 of the width, along the first direction, of the sub pixel 1025a located in the middle region of color film substrate 1022 and not covered by black matrix.

For example, in an example, the width, along the first direction, of the sub pixel 1025a located in the middle region and not covered by at least one of the black matrix and the frame sealant is 180 microns to 200 microns, for example, 185 microns, 190 microns, 195 microns, or 200 microns. The width, along the first direction, of the sub pixel 1025a covered by at least one of the black matrix and the frame sealant is 150 microns to 170 microns, for example, 155 microns, 160 microns, 165 microns, or 170 microns.

For example, in an example, the width of the sub pixel 1025a located on the side of the color film substrate 1022 along the second direction B-B' and not blocked by at least one of the black matrix and the frame sealant is 530 microns to 560 microns, for example, 535 microns, 540 microns, 550 microns, 555 microns or 560 microns. The width of the sub pixel blocked by at least one of the black matrix and the frame sealant is 500 microns to 525 microns, for example, 500 microns, 505 microns, 510 microns, 515 microns, 520 microns or 525 microns, and a blocking ratio is greater than 1/80.

It should be noted that the blocking ratio refers to the ratio of the area of the blocked portion of the sub pixel blocked by the at least one of the black matrix and the frame sealant to the area of the whole sub pixel upon it being not blocked by at least one of the black matrix and the frame sealant.

Figure 5:
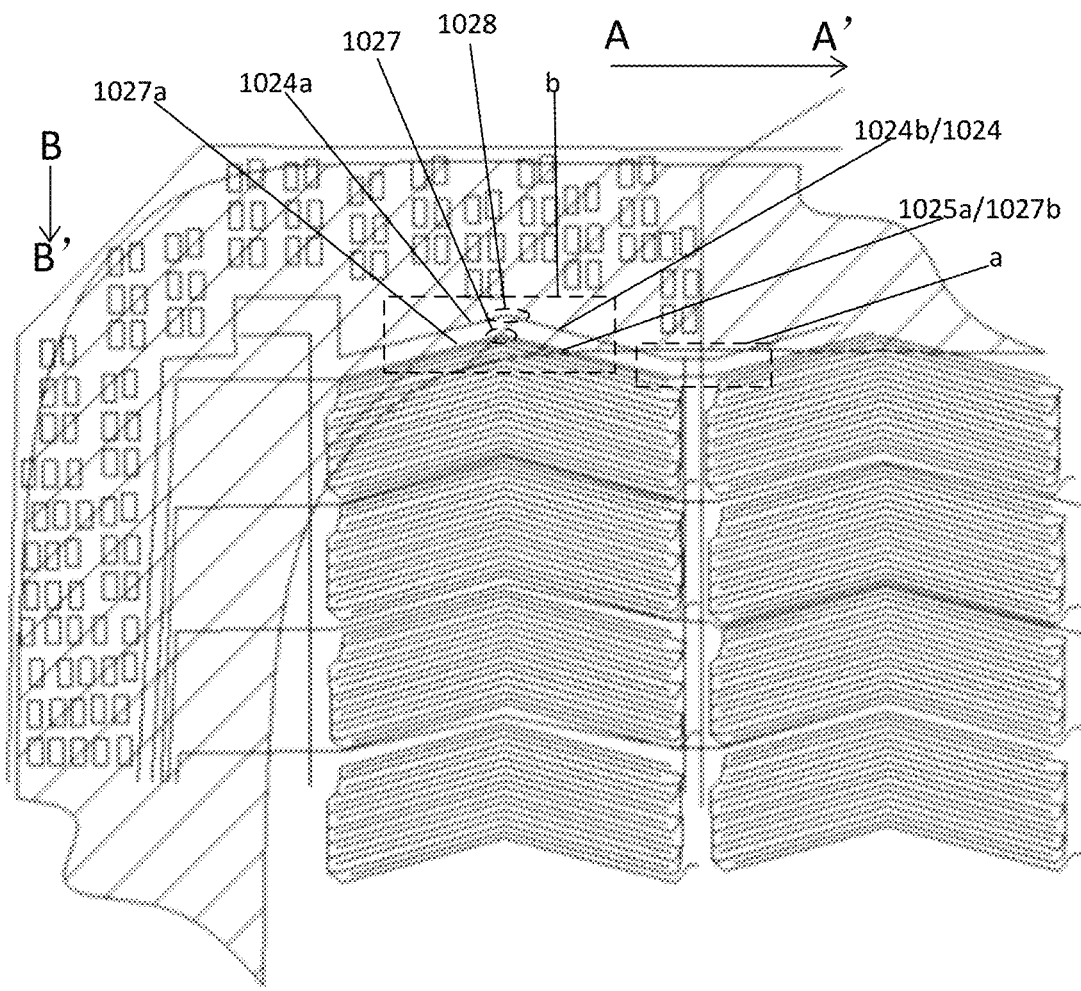
FIG. 5 is a schematic plan view of a sub pixel and a frame sealant provided by an embodiment of the present disclosure.

For example, FIG. 5 is a schematic plan view of a sub pixel and a frame sealant provided by an embodiment of the present disclosure, as illustrated by FIG. 5, at least part of a boundary of the sub pixel 1025a on the color film substrate 1022 is parallel to at least part of the boundary of the frame sealant 1024, which can reduce the possibility of the frame sealant 1024 entering the visible boundary and reduce the edge chromatic aberration offset caused by the misalignment between the color film substrate 1022 and the array substrate 1021.

For example, as illustrated by FIG. 5, the boundary of the sub pixel 1025a has a first corner 1027 formed by a first edge 1027a and a second edge 1027b, and the boundary of the frame sealant 1024 has a second corner 1028 formed by a third edge 1024a and a fourth edge 1024b, the first corner 1027 and the second corner 1028 are conformal with each other, and the first edge 1027a is parallel to the third edge 1024a, the second edge 1027b is parallel to the fourth edge 1024b.

It should be noted that the first corner 1027 and the second corner 1028 are conformal, which refers to that the angles formed by the first corner 1027 and the second corner 1028 are equal, and the two edges forming the first corner 1027 and the two edges forming the second corner 1028 are parallel respectively.

For example, as illustrated by FIG. 5, along the second direction B-B', within a length range corresponding to a single sub pixel 1025a, there are a part A with varying distance and a part B with constant distance between the boundary of the sub pixel 1025a and the boundary of the frame sealant 1024, and a length of the sub pixel 1025a corresponding to the part a with variable distance along the first direction A-A' is smaller than a length of the sub pixel 1025a corresponding to the part B with constant distance along the first direction A-A', that is, the distance between the boundary of the sub pixel 1025a and the boundary of the frame sealant 1024 remains unchanged in the area corresponding to the most boundary of the sub pixels 1025a and the boundary of the frame sealant 1024.

Figure 6:
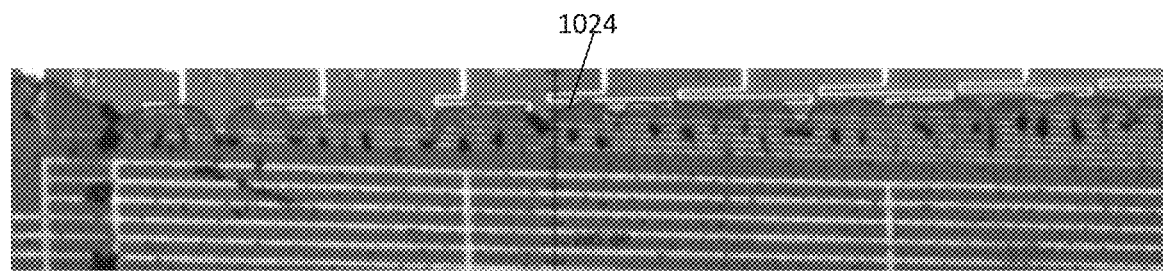
FIG. 6 is a scanning diagram of a boundary of a frame sealant provided by an embodiment of the present disclosure.

For example, the shape of at least part of the boundary of a side of the frame sealant 1024 facing the sub pixel 1025a in the color film substrate 1022 is a broken line with peaks and valleys. For example, FIG. 6 is a scanning diagram of a boundary of a frame sealant provided by an embodiment of the present disclosure, as illustrated by FIG. 6, the shape of at least a part of the boundary of the side of the frame sealant 1024 facing the sub pixel 1025a in the color film substrate 1022 is wavy with peaks and valleys.

For example, with reference to FIG. 3, in an example, in the case where the sub pixel 1025a located on the side of the color film substrate 1022 along the second direction B-B' parallel to the color film substrate 1022 is partially blocked by the frame sealant, and the effective display area of the sub pixel 1025a blocked by the frame sealant is smaller than that of the corresponding sub pixel 1025a located in the middle region of the color film substrate 1022 and not blocked by the frame sealant, a length, along the second direction B-B' of a blocked portion of the sub pixel 1025a located on the side of the color film substrate 1022 along the first direction A-A and covered by the black matrix is ⅛ to ½, for example, ⅛, ⅙, ¼, ⅓, or ½ of a length, along the second direction B-B', of the sub pixel 1025a located in the middle region of the color film substrate 1022 and not covered by the black matrix.

For example, in another example, a width, along the first direction A-A', of a blocked portion of the sub pixel located on the side of the color film substrate 1022 along the first direction A-A' and covered by the black matrix is ¼ to ⅔, for example, ¼, ⅓, ½, or ⅔ of a width, along the first direction A-A', of the sub pixel 1025a located in the middle region of the color film substrate 1022 and not covered by the black matrix.

For example, with reference to FIG. 3, the sub pixels 1025a on the color film substrate 1022 are arranged in a matrix, and each sub pixel 1025a is in a rectangular strip shape, so that the size of the sub pixel 1025a located on the edge of the color film substrate 1022 and blocked by the black matrix or the frame sealant can be better adjusted.

For example, in an example, the display mode of the liquid crystal display panel is ADS mode, and the length, along the second direction B-B', of a blocked portion of the sub pixel 1025a located on the side of the color film substrate 1022 along the first direction A-A' and covered by the black matrix is ⅓ of the length, along the second direction B-B', of the sub pixel 1025a located in the middle region of the color film substrate 1022 and not covered by the black matrix. And the width, along the first direction A-A', of a blocked portion of the sub pixel 1025a located on the side of the color film substrate 1022 along the first direction A-A' and covered by the black matrix is ⅓ of the width, along the first direction A-A', of the sub pixel 1025a located in the middle region of the color film substrate 1022 and not covered by the black matrix, so that the amount of light transmitting the blocked sub pixel 1025a located at the edge can be better determined by blocking the length and the width of the corresponding sub pixel 1025 by the same ratio.

For example, in an example, the display mode of the liquid crystal display panel is IPS mode, and the sub pixel 1025a of the pixel unit 1025 on the color film substrate 1022 presents a ">" shape. The structure of the ">" shaped sub pixel 1025a can be referred to the above description related to FIG. 4, which is omitted herein. For example, the sub pixel 1025a located on the side of the color film substrate 1022 along the second direction B-B' is blocked by the frame sealant, and the length, along the second direction B-B', of a blocked portion of the sub pixel 1025a blocked by the frame sealant is 1/16 of the length, along the second direction B-B', of the corresponding sub pixel 1025a with the same color located in the middle region of the color film substrate 1022 and not blocked by the frame sealant.

Figure 7:
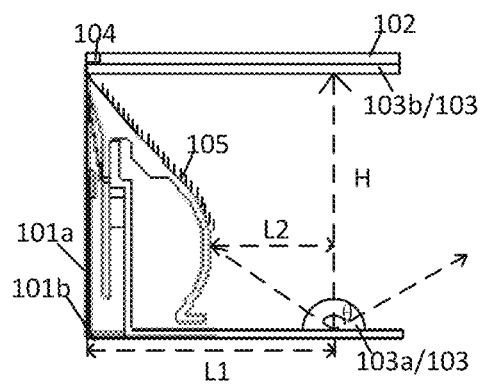
FIG. 7 is a schematic cross-sectional structure diagram of a direct-type backlight liquid crystal display device with a diffuse reflection structure provided by an embodiment of the present disclosure.

For example, FIG. 7 is a schematic cross-sectional structure diagram of a direct-type backlight liquid crystal display device with a diffuse reflection structure provided by an embodiment of the present disclosure, as illustrated by FIG. 7, the main frame 101a protrudes to a side close to the light emitting element 103a to form an arc surface, and a diffuse reflection structure 105 is provided on the arc surface located at the side close to the light emitting element 103a, the position of the diffuse reflection structure 105 is located between $(L1-L2)*\tan(\theta/2)$ and a height H, where L1 is the perpendicular distance from the center of the light emitting element 103a that is closest to the diffuse reflection structure 105 to the edge of a side of the main frame 101a where the diffuse reflection structure 105 is arranged, L2 is the perpendicular distance between the axis of the center of the light emitting element 103a that is closest to the diffuse reflection structure 105 in the direction perpendicular to the main surface of the bottom plate 101b and the diffuse reflection structure 105, H is the perpendicular distance between the main surface of the bottom plate 101b and the main surface of the light homogenizing element 103b close to the bottom plate 101b, and $\theta$ is the effective exiting angle of the light emitting element 103a. For example, the effective exiting angle of the light emitting element 103a is divided into two angles $\theta/2$ with equal size by the axis of the center of the light emitting element 103a in the direction perpendicular to the main surface of the bottom plate 101b.

For example, as illustrated by FIG. 7, the diffuse reflection structure 105 is a reflective film formed by a diffuse reflection painting process, for example, the thickness of the diffuse reflection structure ranges from 0.15 microns to 0.03 millimeters, for example, 0.5 microns, 1 micron, 5 microns, 8 microns, 12 microns, 18 microns, 25 microns or 30 microns. For example, the diffuse reflection angle of each part of the diffuse reflection structure ranges from 300 degrees to 340 degrees. For example, the light incident into the diffuse reflection structure 105 can be refracted many times and then emitted, so that the exiting angles of the light after passing through the diffuse reflection structure meet the above-mentioned angle range.

Figure 8:
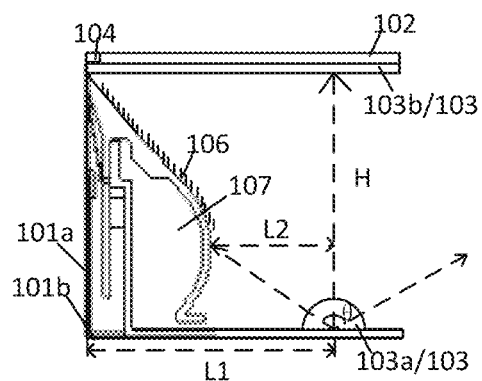
FIG. 8 is a schematic cross-sectional structure diagram of a direct-type backlight liquid crystal display device provided with an optical reflective structure provided by an embodiment of the present disclosure.

For example, FIG. 8 is a schematic cross-sectional structure diagram of a direct-type backlight liquid crystal display device provided with an optical reflective structure provided by an embodiment of the present disclosure, as illustrated by FIG. 8, the main frame 101a protrudes to a side close to the light emitting element 103a to form an arc surface, and an optical reflective structure 106 is provided on the arc surface located at a side close to the light emitting element 103a. The light reflective structure 106 uniformly reflects the direct light from the backlight unit 103 to the light incident side of the liquid crystal display panel 102 or to the light homogenizing element 103b of the backlight unit 103, that is, the light reflective structure 106 can enhance the reflection of the incident light.

For example, in an example, the optical reflective structure 106 is a diffuse reflective coating layer or a directional reflective film. For example, in the case where the optical reflective structure 106 is the diffuse reflective coating layer, the diffuse reflective angle of the optical reflective structure 106 ranges from 300 degrees to 340 degrees, and the diffuse reflective coating layer can be formed by a diffuse reflective painting process.

Figure 9:
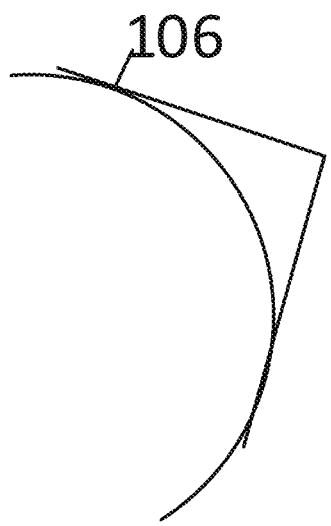
FIG. 9 is a schematic cross-sectional view of the optical reflective structure shown in FIG. 8.

For example, FIG. 9 is a schematic cross-sectional view of the optical reflective structure shown in FIG. 8, for example, in an example, each optical reflective structure 106 has a length of 5 cm and a width of 2.5 cm, and a reflective patch formed by crossing the ends or extension lines of the ends of two adjacent optical reflective structures 106 has an "L" shape.

For example, with reference to FIG. 1, FIG. 7 and FIG. 8, the main frame 101a protrudes to the side close to the light emitting element 103a to form an accommodation space 107 at the arc surface located at a side away from the light emitting element 103a, and a circuit board of the display control unit 104 located at the side close to the light emitting element 103a of the liquid crystal display panel 102 is in the accommodation space 107, so that it is unnecessary to specially set the position for placing the circuit board, thus making the structure of the direct-type backlight liquid crystal display device more compact and lighter.

Figure 10:
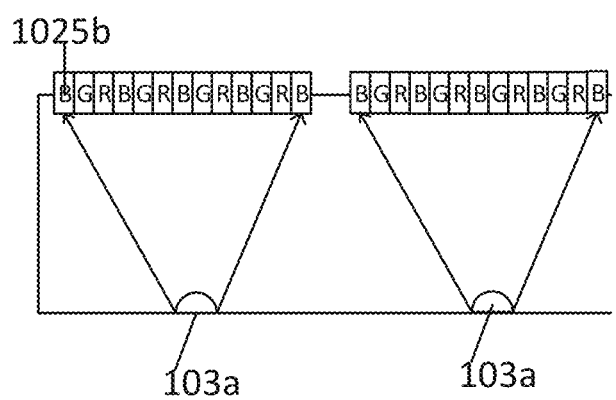
FIG. 10 is a schematic diagram showing a direct-type backlight liquid crystal display device emitting light provided by an embodiment of the present disclosure.

For example, FIG. 10 is a schematic diagram showing a direct-type backlight liquid crystal display device emitting light provided by an embodiment of the present disclosure, as illustrated by FIG. 10, the pixel unit 1025 located on at least one side of the outer periphery of the color film substrate 1022 includes a plurality of blue sub pixels 1025b arranged in sequence, and the plurality of blue sub pixels 1025b correspond to an edge of a light emitting spot of the light emitting element 103a in the backlight unit located on the lower side of the plurality of the blue sub pixels, so that the blue light can be fully utilized.

Figure 11:
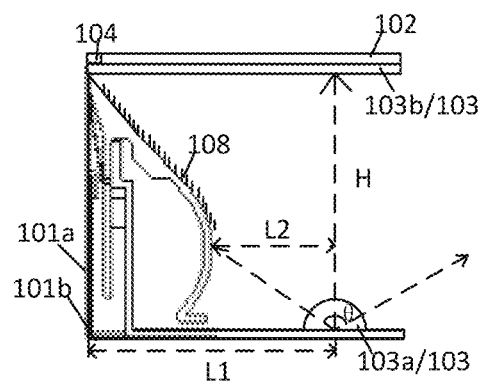
FIG. 11 is a schematic cross-sectional structure diagram of a direct-type backlight liquid crystal display device provided with a reflective unit provided by an embodiment of the present disclosure.

For example, FIG. 11 is a schematic cross-sectional structure diagram of a direct-type backlight liquid crystal display device provided with a reflective unit provided by an embodiment of the present disclosure, with reference to FIG. 11 and FIG. 3, a reflective unit 108 is arranged at a side of the main frame 101a close to the light emitting element 103a, the light emitting element 103a is a blue light emitting diode, and the reflective unit 108 reflects the blue light emitted by the light emitting element 103a to the outermost blue sub pixel 1025b of the color film substrate 1022, so as to improve the utilization ratio of blue light.

For example, with reference to FIG. 11 and FIG. 3, the reflective unit 108 reflects the blue light emitted by the light emitting element 103a to the light incident side of the liquid crystal display panel 102, the effective display area of the blue sub pixels 1025b arranged on at least one side, that is, the blue sub pixels located at the outermost side of the color film substrate 1022 is smaller than the effective display area of the blue sub pixel 1025b located in the middle region of the color film substrate 1022. For example, the effective display area of the blue sub pixels 1025b arranged on at least one side is smaller than the effective display area of the blue sub pixel 1025b located in the middle region of the color film substrate 1022 due to the blocking of the black matrix or the frame sealant. For details, please refer to the relevant descriptions mentioned above, which are omitted herein.

For example, as illustrated by FIGS. 7, 8 and 11, the maximum distance between the center of the light emitting element 103a that is closest to the main frame 101a and the main frame 101a is L=H*tan θ/2, where H is the perpendicular distance between the main surface of the bottom plate 101b and the main surface of the light homogenizing element 103b close to the bottom plate 101b, and θ is the effective exiting angle of the light emitting element 103a. For example, the effective exiting angle of the light emitting element 103a is divided into two angles θ/2 with equal size by the axis of the center of the light emitting element 103a in the direction perpendicular to the main surface of the bottom plate 101b.

For example, the light emitting element 103a is a light emitting diode, and the effective exiting angle θ of the light emitting diode is 30-60 degrees, for example, 30 degrees, 40 degrees, 50 degrees or 60 degrees. The maximum distance L between the light emitting element 103a and the main frame 101a is 2.5 cm to 5 cm, for example, 2.5 cm, 3 cm, 3.5 cm, 4 cm, 4.5 cm or 5 cm.

For example, in an example, the light emitting element 103a is a light emitting diode, the effective exiting angle θ of the light emitting diode is 60 degrees, the maximum distance L between the light emitting element 103a and the main frame 101a is 3.5 cm, and the perpendicular distance H between the main surface of the bottom plate 101b and the main surface of the light homogenizing element 103b close to the bottom plate 101b is 3.5 cm.

Figure 12:
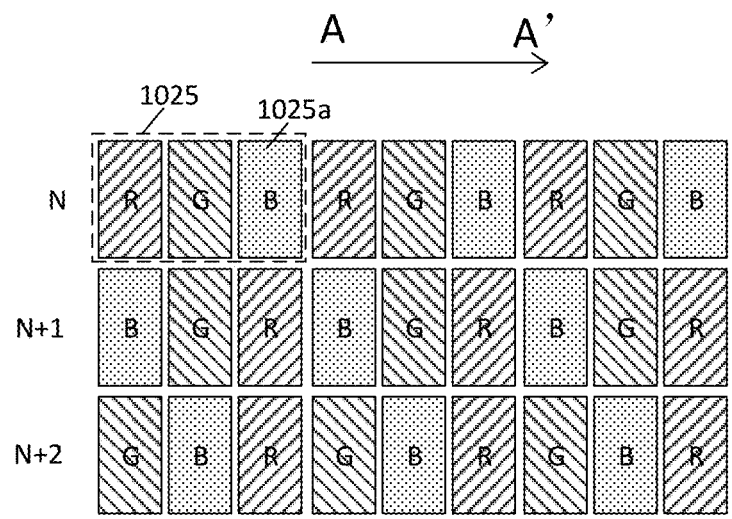
FIG. 12 is a schematic plan view of the arrangement of pixel units in a color film substrate provided by an embodiment of the present disclosure.

For example, FIG. 12 is a schematic plan view of the arrangement of pixel units in a color film substrate provided by an embodiment of the present disclosure, as illustrated by FIG. 12, three sub pixels 1025a included in each pixel unit 1025 in the N-th row are repeatedly arranged in the order of RGB along the first direction A-A', three sub pixels 1025a of each pixel unit 1025 in the (N+1)-th row are arranged repeatedly in the order of GBR along the first direction A-A', and three sub pixels 1025a of each pixel unit 1025 in the (N+2)-th row are arranged repeatedly in the order of BRG along the first direction A-A', where N is a positive integer, for example, N is a positive integer, such as 1, 2, 3, 4 and so on.

Figure 13:
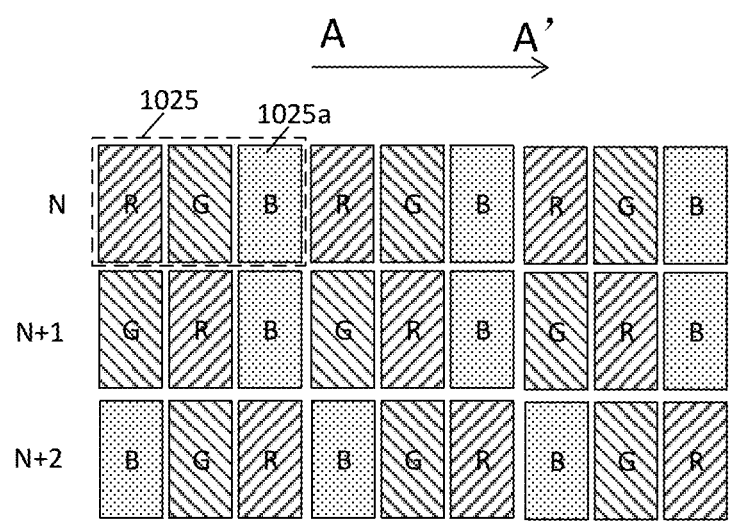
FIG. 13 is a schematic plan view of the arrangement of pixel units in another color film substrate provided by an embodiment of the present disclosure.

For example, FIG. 13 is a schematic plan view of the arrangement of pixel units in another color film substrate provided by an embodiment of the present disclosure, as illustrated by FIG. 13, three sub pixels 1025a included in each pixel unit 1025 in the N-th row are repeatedly arranged in the order of RGB along the first direction A-A', three sub pixels 1025a of each pixel unit 1025 in the (N+1)-th row are arranged repeatedly in the order of GBR along the first direction A-A', and three sub pixels 1025a of each pixel unit 1025 in the (N+2)-th row are arranged repeatedly in the order of BGR along the first direction A-A, where N is a positive integer, for example, N is a positive integer, such as 1, 2, 3, 4 and so on.

Figure 14:
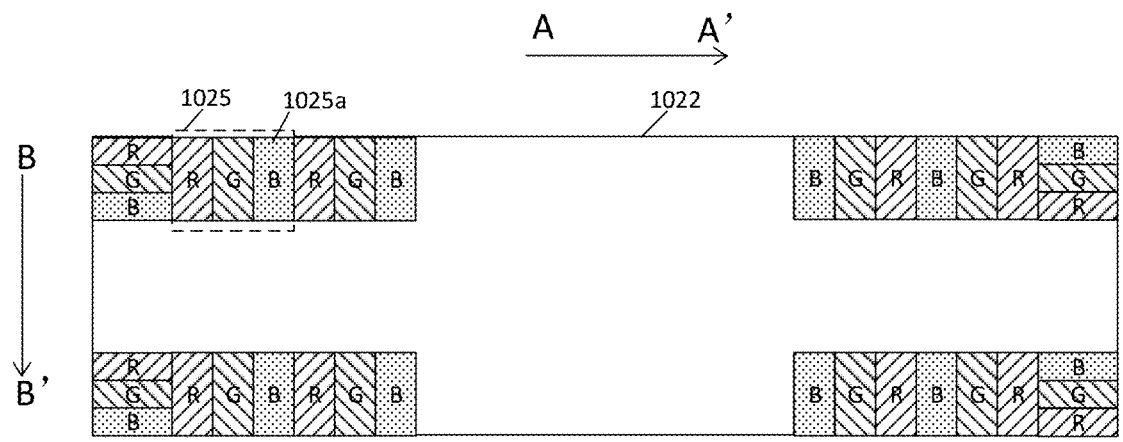
FIG. 14 is a schematic plan view of the arrangement of pixel units in still another color film substrate provided by an embodiment of the present disclosure.

For example, FIG. 14 is a schematic plan view of the arrangement of pixel units in still another color film substrate provided by an embodiment of the present disclosure, as illustrated by FIG. 14, a planar shape of the color film substrate 1022 is rectangular, and vertical pixel units 1025 are provided in areas corresponding to four corners of the color film substrate 1022, and the shapes of three sub pixels 1025a included in each vertical pixel unit 1025 are rectangular strips, and each vertical pixel unit 1025 includes three sub pixels 1025a arranged in turn along a second direction B-B' parallel to the color film substrate 1022, and the long sides of the three sub pixels 1025a are perpendicular to the edge of the liquid crystal display panel 102 along the second direction B-B', which is perpendicular to the first direction A-A'.

For example, as illustrated by FIG. 14, the colors of the three sub pixels 1025a included in each vertical pixel unit 1025 are red sub pixels, green sub pixels and blue sub pixels arranged in sequence along the second direction B-B' parallel to the color film substrate 1022. Of course, the embodiments of the present disclosure are not limited thereto, and the colors of the three sub pixels 1025a included in each vertical pixel unit 1025 are green sub pixels, blue sub pixels and red sub pixels arranged in sequence along the second direction B-B' parallel to the color film substrate 1022, or the colors of the three sub pixels 1025a included in each vertical pixel unit 1025 are blue sub pixels, red sub pixels and green sub pixels arranged in sequence along the second direction B-B' parallel to the color film substrate 1022, and the embodiments of the present disclosure are not limited thereto.

For example, along the first direction A-A', there are red sub pixels, green sub pixels and blue sub pixels arranged in sequence between the vertical pixel unit 1025 in the upper left corner and the vertical pixel unit 1025 in the upper right corner, and a length, along the second direction B-B', of each of the red sub pixels, the green sub pixels and the blue sub pixels arranged in sequence along the first direction A-A' is the sum of the thickness of three sub pixels 1025*a* included in each vertical pixel unit 1025 along the second direction B-B' parallel to the color film substrate 1022.

Figure 15:
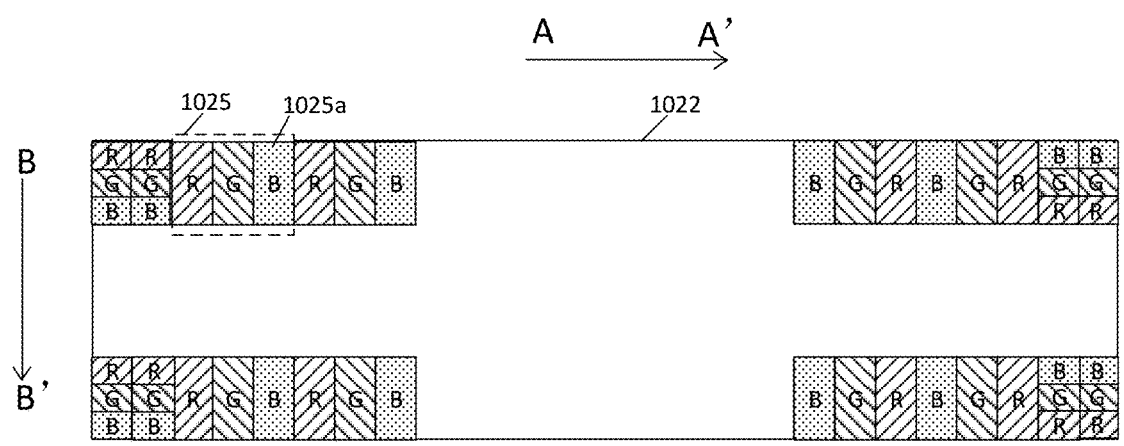
FIG. 15 is a schematic plan view of the arrangement of pixel units in still another color film substrate provided by an embodiment of the present disclosure.

For example, in the direct-type backlight liquid crystal display device provided by at least one embodiment of the present disclosure, 2 to 5 vertical pixel units are provided in the area corresponding to each of the four corners of the color film substrate 1022. For example, FIG. 15 is a schematic plan view of the arrangement of pixel units in still another color film substrate provided by an embodiment of the present disclosure, as illustrated in FIG. 15, two vertical pixel units are provided in the area corresponding to each of the four corners of the color film substrate 1022, and an example of including more vertical pixel units in the area corresponding to each of the four corners of the color film substrate 1022 can be obtained by analogy, and the repeated portions are omitted herein.

Figure 16:
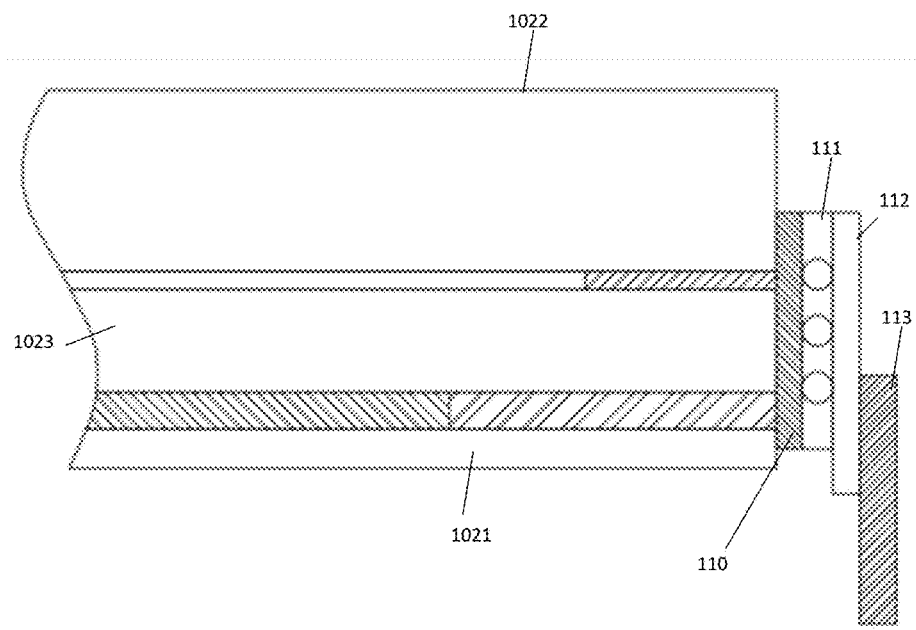
FIG. 16 is a schematic cross-sectional structure diagram of a display control unit and a liquid crystal display panel provided by an embodiment of the present disclosure.

FIG. 16 is a schematic cross-sectional structure diagram of a display control unit and a liquid crystal display panel provided by an embodiment of the present disclosure, as illustrated by FIG. 16, an array substrate 1021, a color film substrate 1022 and a liquid crystal layer 1023 sandwiched between the array substrate 1021 and the color film substrate 1022 constitute a liquid crystal display panel 102. At a side of the liquid crystal display panel 102, a flexible printed circuit board (FPC) 112, an Ag adhesive 110, an anisotropic conductive adhesive 111 and a printed circuit board (PCB) 113 are provided, and the flexible printed circuit board (FPC) 112 and the printed circuit board (PCB) 113 constitute a display control unit 104.

Figure 17:
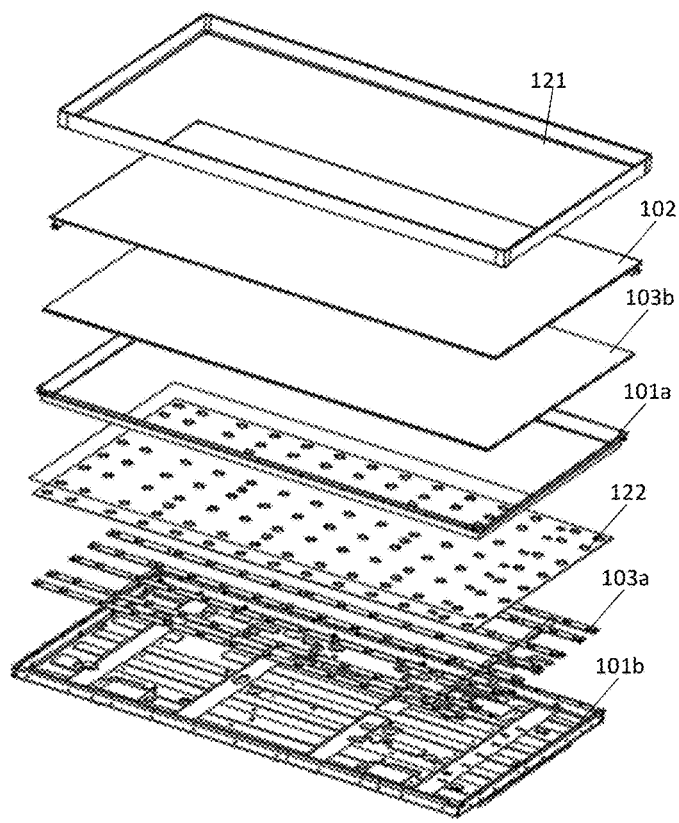
FIG. 17 is an exploded view of a direct-type backlight liquid crystal display device provided by an embodiment of the present disclosure.

For example, FIG. 17 is an exploded view of a direct-type backlight liquid crystal display device provided by an embodiment of the present disclosure, as illustrated by FIG. 17, the direct-type backlight liquid crystal display device includes an outer frame 121, a liquid crystal display panel 102, a light homogenizing element 103*b*, a main frame 101*a*, a reflective plate 122, a light emitting element 103*a* and a bottom plate 101*b*.

Figure 18:
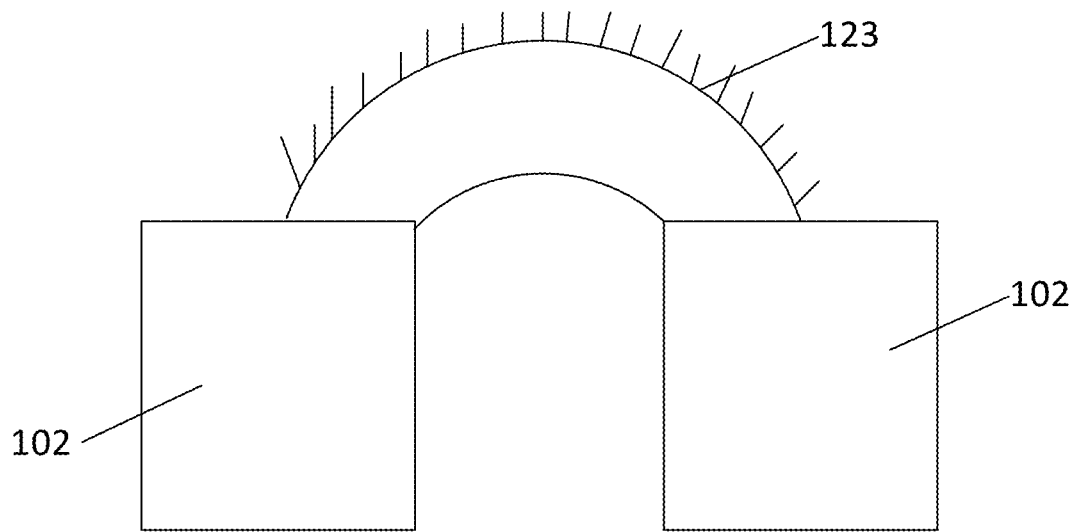
FIG. 18 is a schematic cross-sectional structure diagram of a direct-type backlight liquid crystal display device provided by an embodiment of the present disclosure.

For example, FIG. 18 is a schematic cross-sectional structure diagram of a direct-type backlight liquid crystal display device provided by an embodiment of the present disclosure, as illustrated by FIG. 18, the direct-type backlight liquid crystal display device further includes an optical light guiding structure 123, which is overlapped and jointed at an adjacent position of two liquid crystal display panels 102. The optical light guiding structure 123 enables light at a lower light incident surface of the optical light guiding structure 123 to exit through a main body of the optical light guiding structure 123 and a non-planar optical structure located on a surface of the optical light guiding structure 123 away from the bottom plate 101*b*, and makes a non-display region of a seam between the two liquid crystal display panels 102 located at a lower side of the optical light guiding structure 123 invisible.

For example, as illustrated by FIG. 18, a cross-sectional shape of the surface of the optical light guiding structure 123 away from the bottom plate 101*b* has a zigzag shape or an arc shape, so that better light guiding effect can be achieved.

For example, in an example, the optical light guiding structure 123 includes at least one of a Fresnel optical lens and a light guiding film, and the limitation of the optical light guiding structure 123 in the embodiment of the present disclosure is not limited thereto, but may also be other suitable structures.

For example, in an example, the pixel units 1025 under the optical light guiding structure 123 are formed into 3 to 5 rows or 3 to 5 columns, and the width of the pixel units 1025 in the 3 to 5 rows or 3 to 5 columns increase from the outer periphery to the middle region in turn. The arrangement structure of sub pixels whose widths increase from the outer periphery to the middle region in turn can refer to the relevant descriptions mentioned above, which are omitted herein.

The embodiment of the disclosure provides a direct-type backlight liquid crystal display device, which has at least one of the following beneficial effects:

(1) In the direct-type backlight liquid crystal display device provided by at least one embodiment of the present disclosure, the blue sub pixel is arranged at the outermost edge of the pixel region, so that the unmixed blue light directly passes through the blue sub pixel to improve light efficiency and color saturation, thereby improving the utilization rate of white light emitted by the light emitting diode and improving the uniformity of light emission.

(2) In the direct-type backlight liquid crystal display device provided by at least one embodiment of the present disclosure, at least part of the boundary of the sub pixel in the color film substrate is parallel to at least part of the boundary of the frame sealant, which can reduce the possibility of the frame sealant entering the visible boundary and reduce the edge chromatic aberration offset caused by the misalignment between the color film substrate and the array substrate.

The following statements should be noted.

(1) The accompanying drawings involve only the structure(s) in connection with the embodiment(s) of the present disclosure, and other structure(s) can be referred to common design(s).

(2) For the purpose of clarity, in accompanying drawings for illustrating the embodiment(s) of the present disclosure, the thickness of a layer or a region may be enlarged or narrowed, that is, the drawings are not drawn in a real scale. It is understood that, when an element such as a layer, a film, a part or a substrate is referred to as being "above" or "below" another element, the element may be "directly" "above" or "below" another element, or there may be an intermediate element.

(3) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

The invention claimed is:

1. A direct-type backlight liquid crystal display device, comprising:
   a frame, comprising a main frame and a bottom plate, wherein the main frame is connected with the bottom plate at an end face of the bottom plate;
   a liquid crystal display panel, arranged on a top surface of the main frame and parallel to the bottom plate, wherein the liquid crystal display panel comprises an array substrate, a color film substrate, a liquid crystal layer sandwiched between the array substrate and the color film substrate, and a frame sealant which surrounds the liquid crystal layer, is located between the color film substrate and the array substrate, and is used for fixing the color film substrate and the array substrate, a pixel unit on the color film substrate comprises a sub pixel, and the sub pixel located on a side of the color film substrate along a first direction parallel to the color film substrate is partially blocked and covered by a black matrix, a backlight unit, located on a side of the liquid crystal display panel close to the bottom plate, wherein the backlight unit comprises a light emitting element and a light homogenizing element, the light emitting element is disposed on the bottom plate, light emitted by the light emitting element is projected at a light incident side of the liquid crystal display panel after being adjusted by the light homogenizing element, the light homogenizing element is disposed on the top surface of the main frame, parallel to the bottom plate and fixed with the main frame, a lateral end surface of the light homogenizing element, a lateral end surface of the liquid crystal display panel and a lateral end surface of the main frame are aligned in a direction perpendicular to a main surface of the bottom plate; and a display control unit, disposed at the lateral end surface of the liquid crystal display panel and electrically connected with the liquid crystal display panel at the lateral end surface of the liquid crystal display panel;

the sub pixel located on a side of the color film substrate along a second direction parallel to the color film substrate is partially blocked by the frame sealant, and the first direction is perpendicular to the second direction, and an effective display area of the sub pixel blocked by the frame sealant is smaller than an effective display area of a corresponding sub pixel with a same color located in the middle region of the color film substrate and not blocked by the frame sealant.

2. The direct-type backlight liquid crystal display device according to claim 1, wherein the sub pixel located on the side of the color film substrate along the first direction comprises a blue sub pixel, the blue sub pixel located on the side of the color film substrate along the first direction is partially blocked and covered by the black matrix from one side, and has an effective display area which is smaller than an effective display area of a blue sub pixel in a middle region of the color film substrate.

3. The direct-type backlight liquid crystal display device according to claim 2, wherein the sub pixel located on the side of the color film substrate along the first direction further comprises a red sub pixel, and an effective display area of the red sub pixel located on the side of the color film substrate along the first direction is smaller than an effective display area of a red sub pixel located in the middle region of the color film substrate.

4. The direct-type backlight liquid crystal display device according to claim 3, wherein the effective display area of the blue sub pixel located on the side of the color film substrate and partially blocked and covered by the black matrix is $1/50$ to $4/5$ of the effective display area of the blue sub pixel in the middle region of the color film substrate; and/or the effective display area of the red sub pixel located on the side of the color film substrate along the first direction is $1/50$ to $4/5$ of the effective display area of the red sub pixel located in the middle region of the color film substrate.

5. The direct-type backlight liquid crystal display device according to claim 1, wherein
the effective display area of the sub pixel located on the side of the color film substrate along the second direction and blocked by the frame sealant is $1/50$ to $4/5$ of the effective display area of the corresponding sub pixel with the same color located in the middle region of the color film substrate and not blocked by the frame sealant.

6. The direct-type backlight liquid crystal display device according to claim 1, wherein,
a width, along the first direction, of a blocked portion of the sub pixel located on the side of the color film substrate along the first direction and covered by the black matrix is $1/7$ to $1/3$ of a width, along the first direction, of the sub pixel located in the middle region of the color film substrate and not covered by at least one of the black matrix and the frame sealant; or a length, along the second direction, of a blocked portion of the sub pixel located on the side of the color film substrate along the second direction and blocked by the frame sealant is $1/20$ to $1/3$ of a length, along the second direction, of the corresponding sub pixel with the same color located in the middle region of the color film substrate and not blocked by at least one of the black matrix and the frame sealant.

7. The direct-type backlight liquid crystal display device according to claim 1, wherein a display mode of the liquid crystal display panel is an in-plane switching mode, and the sub pixel of the pixel unit on the color film substrate comprises a first strip-shaped portion extending in a third direction parallel to the color film substrate and a second strip-shaped portion extending in a fourth direction parallel to the color film substrate, so that the sub pixel presents a ">" shape, and an included angle between the first strip-shaped portion and the second strip-shaped portion is 120 degrees to 170 degrees.

8. The direct-type backlight liquid crystal display device according to claim 1, wherein the display mode of the liquid crystal display panel is an advanced super-dimension switching mode, and the sub pixel of the pixel unit on the color film substrate has a rectangular shape, and a length, along the second direction, of a blocked portion of the sub pixel located at the side of the color film substrate along the first direction and covered by the black matrix is $1/8$ to $1/2$ of a length, along the second direction, of a sub pixel located in the middle region of the color film substrate and not covered by the black matrix; or a width, along the first direction, of a covered portion of the sub pixel located at the side of the color film substrate along the first direction and covered by the black matrix is $1/4$ to $2/3$ of a width, along the first direction, of the sub pixel in the middle region of the color film substrate not covered by the black matrix.

9. The direct-type backlight liquid crystal display device according to claim 6, wherein,
the width, along the first direction, of the sub pixel located in the middle region of the color film substrate and not covered by at least one of the black matrix and the frame sealant is 180 microns to 200 microns; the width, along the first direction, of the blocked portion of the sub pixel located on the side of the color film substrate along the first direction and covered by at least one of the black matrix and the frame sealant is 150 microns to 170 microns; or the width, along the second direction, of the sub pixel located on the side of the color film substrate along the second direction and not blocked by at least one of the black matrix and the frame sealant is 530 microns to 560 microns; the width, along the second direction, of the sub pixel blocked by at least one of the black matrix and the frame sealant is 500 microns to 525 microns, and a blocking ratio is larger than 1/80.

10. The direct-type backlight liquid crystal display device according to claim 1, wherein at least part of a boundary of the sub pixel in the color film substrate is parallel to at least part of a boundary of the frame sealant, the boundary of the sub pixel has a first corner formed by a first edge and a second edge, and the boundary of the frame sealant has a second corner formed by a third edge and a fourth edge, the first corner and the second corner are conformal, and the first edge and the third edge are parallel to each other, the second edge and the fourth edge are parallel to each other.

11. The direct-type backlight liquid crystal display device according to claim 10, wherein within a length range corresponding to a single sub pixel along the second direction, there are a part with varying distance and a part with constant distance between the boundary of the sub pixel and the boundary of the frame sealant, and a length of the sub pixel corresponding to the part with varying distance along the first direction is smaller than a length of the sub pixel corresponding to the part with constant distance along the first direction.

12. The direct-type backlight liquid crystal display device according to claim 1, wherein a length, along the second direction, of a blocked portion of the sub pixel located on the side of the color film substrate along the first direction and covered by the black matrix is 1/8 to 1/2 of a length, along the second direction, of the sub pixel located in the middle region of the color film substrate and not covered by the black matrix; or a width, along the first direction, of a blocked portion of the sub pixel located on the side of the color film substrate along the first direction and blocked by the black matrix is 1/4 to 2/3 of a width, along the first direction, of the sub pixel located in the middle region of the color film substrate and not covered by the black matrix.

13. The direct-type backlight liquid crystal display device according to claim 12, wherein sub pixels on the color film substrate are arranged in a matrix, and each of the sub pixels has a rectangular shape, a display mode of the liquid crystal display panel is an advanced super-dimension switching mode, and a length, along the second direction, of a blocked portion of the sub pixel located at the side of the color film substrate along the first direction and covered by the black matrix is 1/3 of a length, along the second direction, of the sub pixel located in the middle region of the color film substrate and not covered by the black matrix; and a width, along the first direction, of a blocked portion of the sub pixel located at the side of the color film substrate along the first direction and covered by the black matrix is 1/3 of a width, along the first direction, of the sub pixel in the middle region of the color film substrate not covered by the black matrix.

14. The direct-type backlight liquid crystal display device according to claim 1, wherein the main frame protrudes to a side close to the light emitting element to form an arc surface, and a diffuse reflection structure is arranged on the arc surface located at the side close to the light emitting element, and a position of the diffuse reflection structure is between $(L1-L2)*\tan(\theta/2)$ and a height H, where L1 is a perpendicular distance from a center of a light emitting element that is closest to the diffuse reflection structure to an edge of a side of the main frame where the diffuse reflection structure is arranged, L2 is a perpendicular distance between an axis of the center of the light emitting element that is closest to the diffuse reflection structure in a direction perpendicular to the main surface of the bottom plate and the diffuse reflection structure, H is a perpendicular distance between the main surface of the bottom plate and a main surface of the light homogenizing element close to the bottom plate, and $\theta$ is an effective exiting angle of the light emitting element.

15. The direct-type backlight liquid crystal display device according to claim 1, wherein the main frame protrudes to the side close to the light emitting element to form an arc surface, and an optical reflective structure is arranged on the arc surface located at the side close to the light emitting element, and the optical reflective structure uniformly reflects direct light of the backlight unit to the light incident side of the liquid crystal display panel or to the light homogenizing element of the backlight unit.

16. The direct-type backlight liquid crystal display device according to claim 15, wherein the main frame protrudes to a side close to the light emitting element to form an accommodation space at the arc surface away from the light emitting element, and a circuit board of the display control unit located at a side of the liquid crystal display panel close to the light emitting element is located in the accommodation space.

17. The direct-type backlight liquid crystal display device according to claim 1, wherein,
the pixel unit located on at least one side of outer periphery of the color film substrate comprises a plurality of blue sub pixels arranged in sequence, the plurality of blue sub pixels correspond to an edge of a light emitting spot of the backlight unit located at a lower side of the plurality of blue sub pixels, and a reflective unit is arranged at a side of the main frame close to the light emitting element, the reflective unit reflects blue light emitted by the light emitting element to a blue sub pixel located on an outermost side of the color film substrate.

18. The direct-type backlight liquid crystal display device according to claim 1, wherein three sub pixels included in each pixel unit in N-th row are arranged repeatedly in an order of RGB along the first direction, three sub pixels included in each pixel unit in (N+1)-th row are arranged repeatedly in an order of GBR along the first direction, and three sub pixels included in each pixel unit in (N+2)-th row are arranged repeatedly in an order of BRG along the first direction, where N is a positive integer; or,
the three sub pixels included in each pixel unit in the N-th row are arranged repeatedly in an order of RGB along the first direction, the three sub pixels included in each pixel unit in the (N+1)-th row are arranged repeatedly in an order of GBR along the first direction, and the three sub pixels included in each pixel unit in the (N+2)-th row are arranged repeatedly in an order of BGR along the first direction, where N is a positive integer.

19. The direct-type backlight liquid crystal display device according to claim 1, further comprising an optical light guiding structure, wherein the optical light guiding structure is overlapped and jointed at an adjacent position of the two liquid crystal display panels, and the optical light guiding structure enables light at a lower light incident surface of the optical light guiding structure to exit through a main body of the optical light guiding structure and a non-planar optical structure located on a surface of the optical light guiding structure away from the bottom plate, and makes a non-display region of a seam between the two liquid crystal display panels located at a lower side of the optical light guiding structure invisible, a cross-sectional shape of the surface of the optical light guiding structure away from the bottom plate has a zigzag shape or an arc shape, or the optical light guiding structure comprises at least one of a Fresnel optical lens and a light guide film.

\* \* \* \* \*